United States Patent
Kimura et al.

(10) Patent No.: US 7,800,789 B2
(45) Date of Patent: Sep. 21, 2010

(54) ANALOG FRONT-END CIRCUIT AND ELECTRONIC DEVICE

(75) Inventors: Kenji Kimura, Sapporo (JP); Masahiko Mizuta, Sapporo (JP)

(73) Assignee: Seiko Epson Corporation (JP)

( * ) Notice: Subject to any disclaimer, the term of this patent is extended or adjusted under 35 U.S.C. 154(b) by 1268 days.

(21) Appl. No.: 11/346,536

(22) Filed: Feb. 2, 2006

(65) Prior Publication Data

US 2006/0176201 A1 Aug. 10, 2006

(30) Foreign Application Priority Data

Feb. 10, 2005 (JP) ............................. 2005-034474

(51) Int. Cl.
*H04N 1/04* (2006.01)
(52) U.S. Cl. ...................... 358/474; 358/482; 358/471; 358/494; 358/443; 358/516; 348/294; 348/245; 396/310; 324/144; 324/642; 382/199; 341/144; 341/155; 341/118
(58) Field of Classification Search ................. 358/482, 358/483, 518, 516, 497, 443, 471, 486, 494, 358/474, 506; 348/245, 312, 222.1, 233, 348/E5.038; 396/310; 324/144, 637, 642; 341/144, 155, 118; 382/199
See application file for complete search history.

(56) References Cited

U.S. PATENT DOCUMENTS

| | | | | |
|---|---|---|---|---|
| 3,763,357 A | * | 10/1973 | Morton | 377/10 |
| 3,805,028 A | * | 4/1974 | Morton | 382/133 |
| 4,051,458 A | * | 9/1977 | Morton | 382/274 |
| 4,355,328 A | * | 10/1982 | Kulik | 348/38 |
| 4,752,897 A | * | 6/1988 | Zoeller et al. | 702/40 |
| 4,803,550 A | * | 2/1989 | Yabe et al. | 348/68 |
| 4,910,599 A | * | 3/1990 | Hashimoto | 348/240.2 |
| 5,010,395 A | * | 4/1991 | Tsuji et al. | 348/71 |
| 5,309,183 A | * | 5/1994 | Sasaki et al. | 348/231.7 |
| 5,801,652 A | * | 9/1998 | Gong | 341/131 |
| 6,128,106 A | * | 10/2000 | Watanabe et al. | 358/498 |
| 6,377,199 B1 | * | 4/2002 | Watanabe | 341/155 |
| 6,597,394 B1 | * | 7/2003 | Duncan et al. | 348/222.1 |
| 6,750,876 B1 | * | 6/2004 | Atsatt et al. | 345/656 |

(Continued)

FOREIGN PATENT DOCUMENTS

JP 08-079634 3/1996

(Continued)

*Primary Examiner*—Negussie Worku
(74) *Attorney, Agent, or Firm*—Harness, Dickey & Pierce, P.L.C.

(57) ABSTRACT

An analog front-end circuit controlling an imaging device and processing an analog image signal output from the imaging device includes: an analog processing section that receives an analog image signal from the imaging device, provides the image signal with predetermined processing, and outputs the image signal; an A/D converter that performs A/D conversion with the image signal output from the analog processing section; a transmitter circuit that receives digital image data output from the A/D converter, generates a differential signal based on the digital image data, and outputs the differential signal; and a timing generator that generates a plurality of clocks including a multiphase driving clock for driving the imaging device based on a first reference clock; the transmitter circuit including a differential amplifier circuit that generates a differential signal based on the digital image data output from the A/D converter, and outputting the differential signal generated in the differential amplifier circuit.

14 Claims, 12 Drawing Sheets

U.S. PATENT DOCUMENTS

| | | |
|---|---|---|
| 6,903,847 B2 | 6/2005 | Tsukada |
| 6,906,751 B1 * | 6/2005 | Norita et al. ................. 348/349 |
| 6,930,718 B2 * | 8/2005 | Parulski et al. ......... 348/333.11 |
| 7,092,029 B1 * | 8/2006 | Medwick et al. ............. 348/371 |
| 7,184,079 B2 * | 2/2007 | Hoshuyama ............. 348/223.1 |
| 7,489,575 B2 * | 2/2009 | Baker ......................... 365/207 |
| 2003/0142219 A1 * | 7/2003 | Mcgarvey et al. ........ 348/222.1 |
| 2004/0160652 A1 | 8/2004 | Kimura |
| 2005/0146758 A1 * | 7/2005 | Tsuchihashi ................ 358/506 |
| 2006/0018653 A1 * | 1/2006 | Kido ........................... 396/310 |
| 2007/0253694 A1 * | 11/2007 | Miyazawa et al. .......... 396/234 |
| 2008/0204297 A1 * | 8/2008 | Mizuta ....................... 341/155 |

FOREIGN PATENT DOCUMENTS

| | | |
|---|---|---|
| JP | 10-304135 | 11/1998 |
| JP | 11-127303 | 5/1999 |
| JP | 2000-092255 | 3/2000 |
| JP | 2001-223842 | 8/2001 |
| JP | 2003-110798 | 4/2003 |
| JP | 2004-172854 | 6/2004 |

* cited by examiner

| No. | 15 | 14 | 13 CK2 | 12 CK1 | 11 | 10 SNCK4 | 9 SNCK3 | 8 SNCK2 | 7 SNCK1D_odd | 6 SNCK1D_even | 5 SNCK1C_odd | 4 SNCK1C_even | 3 SNCK1B_odd | 2 SNCK1B_even | 1 SNCK1A_odd | 0 SNCK1A_even | INTERNAL STATE |
|---|---|---|---|---|---|---|---|---|---|---|---|---|---|---|---|---|---|
| 0x00 | — | — | 0 | 1 | — | 0 | 1 | 0 | 1 | 1 | 1 | 1 | 1 | 1 | 1 | 1 | 0 |
| 0x01 | — | — | 0 | 1 | — | 0 | 1 | 1 | 1 | 1 | 1 | 1 | 1 | 1 | 1 | 1 | 1 |
| 0x02 | — | — | 0 | 1 | — | 0 | 1 | 1 | 1 | 1 | 1 | 1 | 1 | 1 | 1 | 1 | 2 |
| 0x03 | — | — | 0 | 1 | — | 0 | 1 | 0 | 1 | 1 | 1 | 1 | 1 | 1 | 1 | 1 | 3 |
| 0x04 | — | — | 0 | 1 | — | 0 | 1 | 0 | 1 | 1 | 1 | 1 | 1 | 1 | 1 | 1 | 4 |
| 0x05 | — | — | 0 | 1 | — | 0 | 1 | 0 | 1 | 1 | 0 | 0 | 0 | 0 | 0 | 0 | 5 |
| 0x06 | — | — | 0 | 1 | — | 0 | 1 | 0 | 1 | 1 | 0 | 0 | 0 | 0 | 0 | 0 | 6 |
| 0x07 | — | — | 0 | 1 | — | 0 | 1 | 0 | 1 | 1 | 0 | 0 | 1 | 1 | 0 | 0 | 7 |
| 0x08 | — | — | 0 | 1 | — | 0 | 1 | 0 | 1 | 1 | 1 | 1 | 1 | 1 | 0 | 0 | 8 |
| 0x09 | — | — | 0 | 0 | — | 0 | 1 | 0 | 0 | 0 | 1 | 1 | 1 | 1 | 0 | 0 | 9 |
| 0x0A | — | — | 0 | 0 | — | 0 | 1 | 0 | 1 | 1 | 1 | 1 | 1 | 1 | 0 | 0 | 10 |
| 0x0B | — | — | 0 | 0 | — | 0 | 1 | 0 | 1 | 1 | 1 | 1 | 1 | 1 | 0 | 0 | 11 |
| 0x0C | — | — | 1 | 0 | — | 0 | 1 | 0 | 1 | 1 | 1 | 1 | 1 | 1 | 0 | 0 | 12 |
| 0x0D | — | — | 1 | 0 | — | 0 | 1 | 0 | 1 | 1 | 1 | 1 | 1 | 1 | 0 | 0 | 13 |
| 0x0E | — | — | 1 | 0 | — | 0 | 1 | 0 | 1 | 1 | 1 | 1 | 1 | 1 | 0 | 0 | 14 |
| 0x0F | — | — | 1 | 0 | — | 0 | 1 | 0 | 1 | 1 | 1 | 1 | 1 | 1 | 0 | 0 | 15 |

FIG. 6

ANALOG FRONT-END CIRCUIT AND ELECTRONIC DEVICE

BACKGROUND OF THE INVENTION

1. Technical Field

The present invention relates to an analog front-end circuit and an electronic device.

2. Related Art

With an image sensor used for an image scanner or the like, image data (image signal) is acquired by a light receiving section of the image sensor, and is taken into a transfer section of the image sensor. An image sensor controller controlling the image sensor supplies a driving clock to the transfer section, and the transfer section uses the supplied driving clock to successively shift and transfer the image data externally.

An image scanner that scans an image by using a board for the scanning head (hereinafter referred to as a "board for head") (carriage) on which a line type image sensor is mounted is known. When the image is read, the board for the head is driven by a servo motor or the like so that the position for reading is gradually changed. The board for head is movable in such a manner, and therefore is connected with a long cable to a main board on which a circuit for generating control signals of the servo motor, and the like are mounted. Image data read by an image sensor and a driving clock needed for shifting and transferring of the image sensor, for example, are supplied through the cable.

However, the recent improvements in image reading techniques and the like have enhanced a trend towards an image sensor with high resolution. If such an image sensor with high resolution is used for an image scanner, the need to increase frequency of the driving clock arises. An amount of image data transferred via a cable also increases as resolution increases. Accordingly, for the image scanner in which the board for head is connected to the main board with a long cable, for example, radiation noise that occurs in the cable carrying the image data, driving clocks, etc., and the like, have become problems. As a result, it has been necessary to take measures against electro magnetic interference (EMI).

JP-A-2004-172854 is an example of related art.

SUMMARY

An advantage of some aspects of the invention is to provide an analog front-end circuit in which the degradation of image data transmitted from an imaging device is suppressed and measures against EMI are taken and an electronic device including this circuit.

One aspect of the invention relates to an analog front-end circuit that controls an imaging device and processes an analog image signal output from the imaging device, the analog front-end circuit including: an analog processing section that receives an analog image signal from the imaging device, provides the image signal with predetermined processing, and outputs the image signal; an A/D converter that performs A/D conversion with the image signal output from the analog processing section; a transmitter circuit that receives digital image data output from the A/D converter, generates a differential signal based on the digital image data, and outputs the differential signal; and a timing generator that generates a plurality of clocks including a multiphase driving clock for driving the imaging device based on a first reference clock; the transmitter circuit including a differential amplifier circuit that generates a differential signal based on the digital image data output from the A/D converter, and outputting the differential signal generated in the differential amplifier circuit.

According to one aspect of the invention, the transmitter circuit can output digital image data by using a differential signal. Accordingly, even if image data output from the analog front-end circuit is output to a main board or the like through a long cable, radiation noise generated in the cable can be made sufficiently small Since the analog front-end circuit includes the ting generator, a driving clock required for the imaging device can be generated in the analog front-end circuit. For example, even if a board for head, on which the imaging device and the analog front-end circuit are mounted, and the main board or the like are connected with each other with a long cable, a driving clock having a high frequency can be supplied to the imaging device without passing through the cable, and thus radiation noise generated in the cable can be made sufficiently small.

In the analog front-end circuit of one aspect of the invention, the timing generator may generate a transmission clock as a clock included in the plurality of clocks and output the transmission clock to the transmitter circuit, and the transmitter circuit may generate a differential signal based on the transmission clock and generate a differential clock signal being a synchronizing clock of the differential signal that the transmitter circuit outputs.

In this case, since the timing generator can generate a transmission clock, the analog front-end circuit can supply a clock having a frequency appropriate for the transmitter circuit to the transmitter circuit without having an oscillator for the transmitter circuit independently provided.

The analog front-end circuit of one aspect of the invention may further include a PLL circuit that receives a second reference clock, generates a clock by multiplying a frequency of the second reference clock by N (a natural number equal to or greater than 1), and outputs the clock as the first reference clock.

In this case, the first reference clock can be generated by multiplying the second reference clock. Accordingly, a clock required for control of an imaging device such as a driving clock, a clock required for A/D conversion, and the like can be adjusted by setting the multiplying factor to a desired value. Namely, the analog front-end circuit according to one aspect of the invention can flexibly cope with the demands of users to enhance its versatility.

The analog front-end circuit of one aspect of the invention may further include a receiver circuit that receives a reference clock differential signal, generates the second reference clock based on the reference clock differential signal received, and supplies the second reference clock to the PLL circuit.

Thus, the PLL circuit can receive the second reference clock from the receiver circuit and generate the first reference clock based on the second reference clock.

In the analog front-end circuit of one aspect of the invention, the receiver circuit may receive the reference clock differential signal through a connection cable connecting the transmitter circuit and a main board on which an image processing section processing image data output from the transmitter circuit is mounted from the main board.

Thus, the analog front-end circuit can drive the imaging device based on a reference clock differential signal supplied from the main board or the like. Furthermore, since the reference clock differential signal is a differential signal, radiation noise in the connection cable can be reduced even if the reference clock differential signal is supplied to the analog front-end circuit through the connection cable.

In the analog front-end circuit of one aspect of the invention, the timing generator may generate an A/D converter clock that the A/D converter uses for performing A/D conversion, as a clock included in the plurality of clocks, and output the A/D converter clock to the A/D converter.

Thus, the A/D converter can perform A/D conversion based on the A/D converter clock.

In the analog front-end circuit of one aspect of the invention, the timing generator may generate a timing control clock for the analog processing section, as a clock included in the plurality of clocks, and outputs the timing control clock to the analog processing section.

Thus, the analog processing section can perform certain processing based on the timing control clock.

In the analog front-end circuit of one aspect of the invention, the analog processing section may perform correlated double sampling and amplifying as the certain processing.

Thus, the analog processing section can remove noise and the like from an analog image signal output from the imaging device and adjust the analog image signal to a signal level appropriate for the A/D converter at the subsequent stage, thereby allowing the image data to be accurately processed.

In the analog front-end circuit of one aspect of the invention, the timing generator may include a clock pattern set register for setting clock patterns of the plurality of clocks, and may generate the plurality of clocks with different clock patterns from the first reference clock based on a set value of the clock pattern set register.

Thus, the timing generator can generate a plurality of clock patterns from the first reference clock, and therefore can generate a plurality of clocks. Since the analog front-end circuit includes the timing generator, the analog front-end circuit can drive the imaging device without the supply of a plurality of clocks from the outside, and thus can acquire image data from the imaging device.

In the analog front-end circuit of one aspect of the invention, setting information of the clock pattern set register of the timing generator may be set based on a control signal supplied from the main board on which the image processing section processing image data output from the transmitter circuit is mounted, and the control signal may be supplied by serial communication.

Thus, setting information of the clock pattern set register can be set arbitrarily. Since control signals to control the setting information of the clock pattern set register are transmitted by serial communication (e.g. CNOS level), the number of pieces of wiring of the connection cable to which signals are supplied from the main board can be reduced.

The analog front-end circuit of one aspect of the invention may further include between the A/D converter and the transmitter circuit a selector that outputs the digital image data output from the A/D converter by using time division multiplexing, wherein the selector divides the digital image data into data of a certain bit and sequentially outputs the data divided to the transmitter circuit by using time division multiplexing.

Thus, the number of bits of a signal output from the transmitter circuit can be reduced, and therefore the number of pieces of wiring of the connection cable can be reduced. If there are a plurality of A/D converters that acquire image data of a plurality of pixels from the imaging device and convert the image data from analog to digital, the selector can output the image data by using time division multiplexing, and thus can smoothly output the image data.

Another aspect of the invention relates to an electronic device, including a board for head on which the analog front-end circuit of one aspect of the invention and the imaging device are mounted, a main board on which an image processing section processing image data output from the analog front-end circuit is mounted, and a connection cable connecting the board for head and the main board, wherein the connection cable includes a plurality of pairs of differential signal lines, and wherein image data output from the analog front-end circuit is transmitted by a differential signal through the connection cable.

According to another aspect of the invention, since the timing generator can generate a driving clock, a driving clock having a high frequency can be supplied to the imaging device without passing through the connection cable. Thus, radiation noise generated in the connection cable can be made sufficiently small. Since the connection cable includes a plurality of pairs of differential signal lines, a signal supplied through the differential signal line can reduce the generation of radiation noise. As a result, the radiation noise generated in the connection cable can be made small.

In the electronic device of another aspect of the invention, the plurality of driving clocks for driving the imaging device may be supplied from the analog front-end circuit to the imaging device without passing through the connection cable.

According to another aspect of the invention, a driving clock is supplied to the imaging device without passing through the connection cable, and therefore does not contribute to radiation noise generated in the connection cable even though the driving clock has a high frequency. Thus, it is easy to take measures against EMI for the electronic device.

In the electronic device of another aspect of the invention, the main board may include a differential signal receiver circuit that receives a differential signal transmitted through the connection cable, and a differential signal transmitter circuit that transmits a reference clock through the connection cable to the board for head by using a differential signal.

BRIEF DESCRIPTION OF THE DRAWINGS

The invention will be described with reference to the accompanying drawings, wherein like numbers refer to like devices.

FIG. 6 is a table showing an exemplary setting of a clock pattern setting register according to the embodiment.

DESCRIPTION OF THE EMBODIMENT

An embodiment of the invention will now be described. It should be noted that the present embodiment is not intended to limit the scope of the invention defined by the appended claims, and all the combinations of the features described in the embodiment are not necessarily essential for the invention.

1. Image Sensor

Figure 1A:
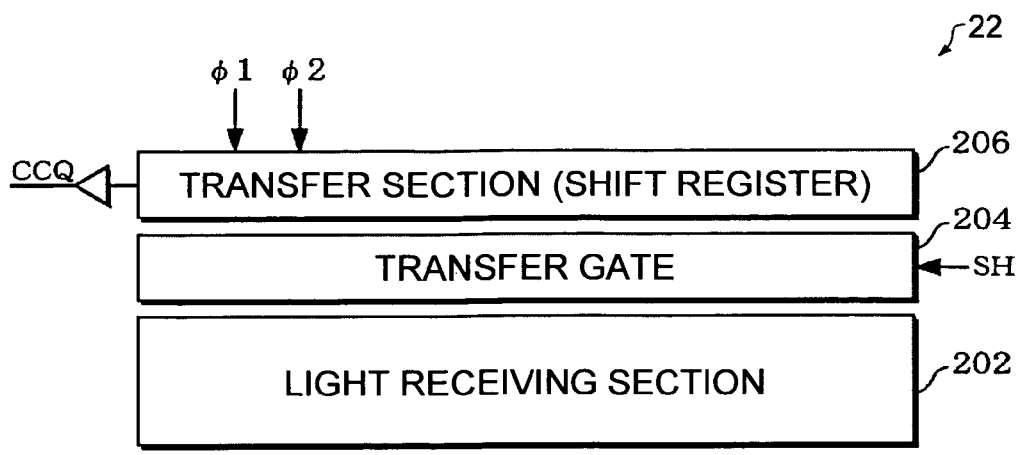
FIGS. 1A to 1C are diagrams illustrating an image sensor.

FIG. 1A shows an exemplary structure of an image sensor 22 (imaging device in a broad sense). The image sensor 22 (e.g. CCD line sensor) includes, for example, a light receiving section 202, a transfer gate 204, and a transfer section (shift register) 206. The light receiving section 202 also includes a plurality of light receiving devices (photodiodes, pixels) that perform photoelectric conversion. In the drawings referred to below, the same or similar devices are denoted by the same numbers.

Each light receiving device (pixel) of the light receiving section 202 generates and accumulates a charge in accordance with the amount of received light. After a predetermined time period required for accumulating a charge has elapsed, a shift signal SH becomes active and the transfer gate 204 is turned on. Thus, the accumulated charge, which is analog image data, is transferred through the transfer gate 204 to a shift register of the transfer section 206 (each shift register corresponding to the relevant light receiving device). The image data (accumulated charge, image signals in a broad sense) transferred to each shift register is transferred between the adjacent shift registers based on two-phase driving clocks, $\phi 1$ and $\phi 2$, and is serially output from a CCQ terminal of the image sensor 22.

Figure 1B:
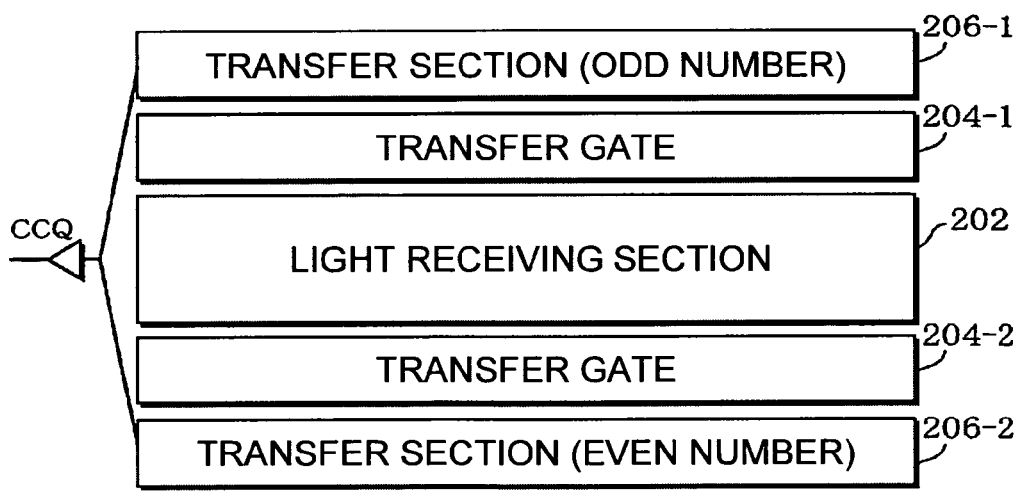

The structure of the image sensor 22 is not limited to that shown in FIG. 1A. As shown in FIG. 1B, for example, it is preferable to provide a transfer gate 204-1 and a transfer section 206-1 for odd-numbered pixels, and a transfer gate 204-2 and a transfer section 206-2 for even-numbered pixels. It is also preferable to provide a light receiving section, a transfer gate, and a transfer section to read image data for each of red (R), green (G), and blue (B) in the structures shown in FIGS. 1A and 1B.

Figure 1C:
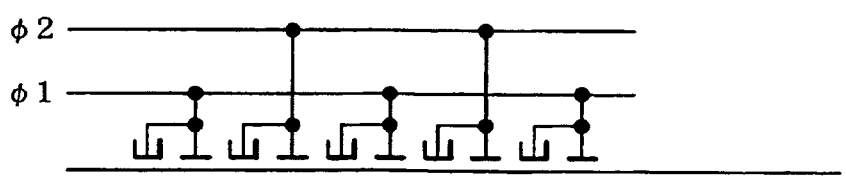

FIG. 1C shows an exemplary structure of a shift register of the transfer section 206.

2. Analog Front-end Circuit

Figure 2:
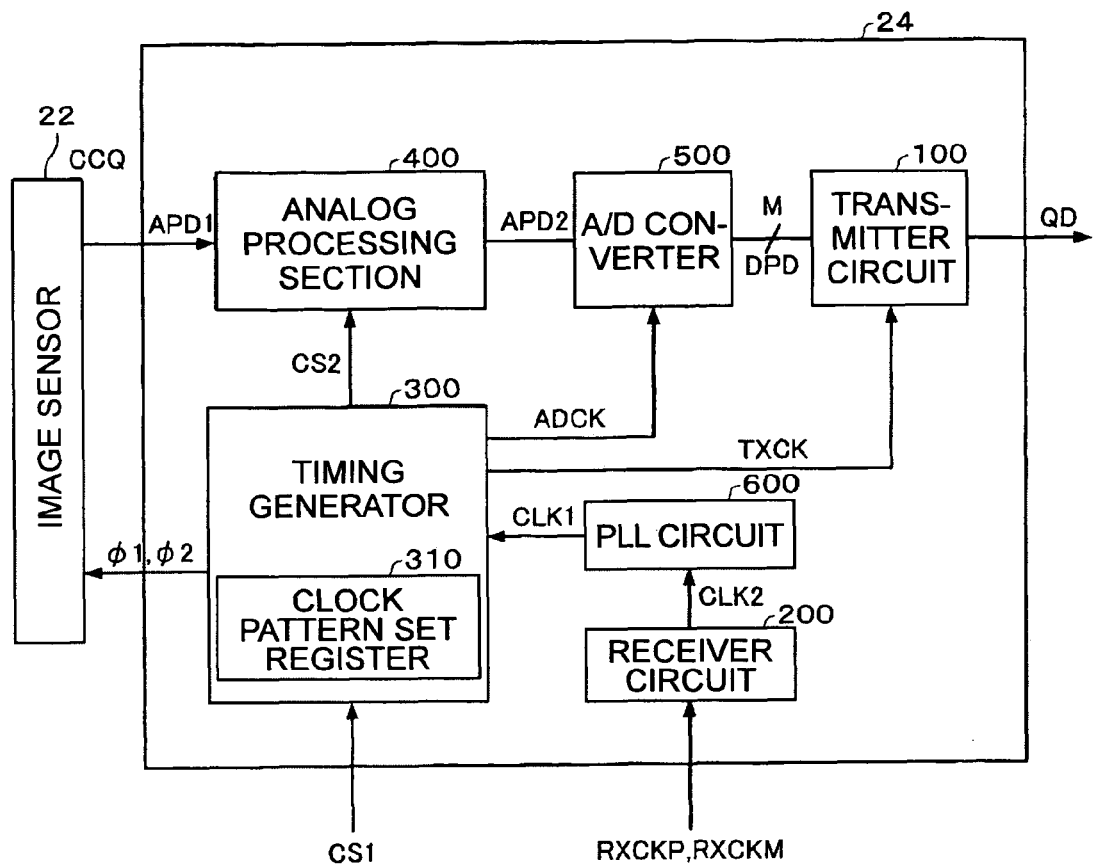
FIG. 2 is a block diagram illustrating an exemplary structure of an analog front-end circuit according to the present embodiment.

FIG. 2 shows an exemplary structure of an analog front-end circuit 24 according to the embodiment. The analog front-end circuit 24 includes, but is not limited to, a transmitter circuit 100, a receiver circuit 200, a timing generator 300, an analog processing section 400, an A/D converter 500, and a PLL circuit 600. The structure in which the analog processing section 400 and the PLL circuit 600 are omitted, for example, is also possible.

The timing generator 300 receives a reference clock CLK1 from the PLL circuit 600, generates a plurality of clocks based on a control signal CS1, and supplies to the image sensor 22, the transmitter circuit 100, the analog processing section 400, and the A/D converter 500 the different clocks that correspond to each of them. Specifically, the timing generator 300 supplies, among the plurality of clocks generated, the driving clocks $\phi 1$ and $\phi 2$ to the image sensor 22, a transmission clock TXCK to the transmitter circuit 100, an A/D converter clock ADCK to the A/D converter 500, and a timing control clock CS2 to the analog processing section 400, respectively.

The receiver circuit 200 receives differential signals RXCKP and RXCKM, generates a reference clock CLK2 based on the differential signals RXCKP and RXCKM, and outputs the generated reference clock to the PLL circuit 600. The PLL circuit 600 receives the reference clock CLK2 from the receiver circuit 200, generates the reference clock CLK1 (first reference clock in a broad sense) by multiplying the reference clock CLK2 by a given factor, and outputs the generated reference clock to the timing generator 300. The PLL circuit 600 can arbitrarily choose the multiplying factor, for example, by using the register. For example, if the reference clock CLK2 is 10 MHz, the frequency of the reference clock CLK1 can be set at 120 MHz by setting the multiplying factor of the PLL circuit 600 at 12, for example. The PLL circuit 600 is not limited to the structure described above; its multiplying factor may be fixed.

In addition, the receiver circuit 200 may be omitted and a clock generation circuit to generate the reference clock CLK2 may be provided in the analog front-end circuit 24.

The analog processing section 400 receives analog image data APD1 that is serially output from the CCQ terminal of the image sensor 22, performs predetermined analog processing, for example, based on the timing control clock CS from the timing generator, and outputs the processed data to the A/D converter 500.

The A/D converter 500 converts the analog image data APD2 from the analog processing section 400 to digital data based on the A/D converter clock ADCK from the timing generator 300, and outputs digital image data DPD to the transmitter circuit 100 at the subsequent stage. At this point, the digital image data DPD is output in parallel as data of M (M is a natural number) bits to the transmitter circuit 100.

The A/D converter clock ADCK is set at 10 MHz, for example, in the embodiment. Since the analog image data APD2 is output in serial, for example, the A/D converter 500 sequentially converts the image data APD2 from analog to digital The A/D converter 500 outputs M (M is a natural number, e.g. 16) pieces of A/D converted data in parallel as the digital image data DPD of M bits based on the clock ADCK to the transmitter circuit 100.

The transmitter circuit 100 receives each of signals of M bit image data DPD and the transmission clock TXCK, generates differential signals from each of the signals, and outputs the generated signal, for example, as (M+1) pairs of differential signals QD. The plurality of pairs of differential signals QD are supplied from the analog front-end circuit 24, for example, to the main board or the like.

Figure 3:
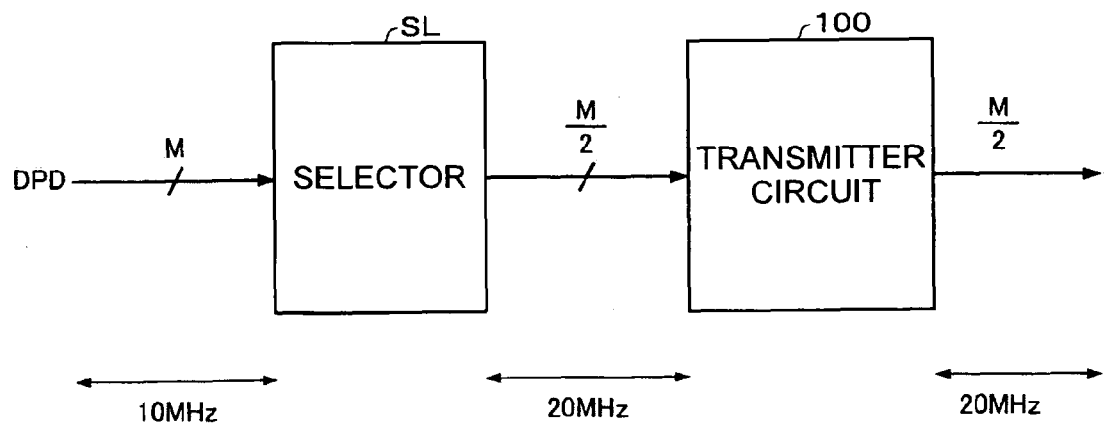
FIG. 3 is a diagram illustrating a selector according to the embodiment.

A selector SL shown in FIG. 3 may be provided between the A/D converter 500 and the transmitter circuit 100. The selector SL can divide and output the image data DPD output from the A/D converter 500 by using time division multiplexing. The term "time division" referred to herein means dividing a period, for example, of the clock for the image data DPD and then dividing the image data DPD so as to correspond to each divided period. For example, if the image data DPD is output in synchronization with a 10 MHz clock, the selector SL that processes the image data DPD can output the data in synchronization with a 20 MHz clock to the transmitter circuit 100 by dividing 1 clock period of the image data DPD into two parts.

The M bit image data DPD output from the A/D converter 500 is divided into data having a predetermined number of bits and is output to the transmitter circuit 100 by using time division multiplexing. Specifically, the selector SL divides the image data DPD of M bits, for example, into image data of M/2 bits, and subsequently outputs the divided image data to the transmitter circuit 100, by using time division multiplexing. For example, if the image data DPD of M bits is output in synchronization with a 10 MHz clock from the A/D converter 500, data of 10 MHz×M bits is inputted per second to the selector SL. At this point, by using time division multiplexing, if the selector SL divides the image data DPD into two pieces of image data, image data to be output is set to M/2 bits. Namely, the selector SL in this case outputs the M/2 bit image data in synchronization with a 20 MHz clock.

The structure described above can reduce signal lines required for the image data output from the transmitter circuit 100, for example, to the half.

2.1 Transmitter Circuit and Receiver Circuit

Figure 4:
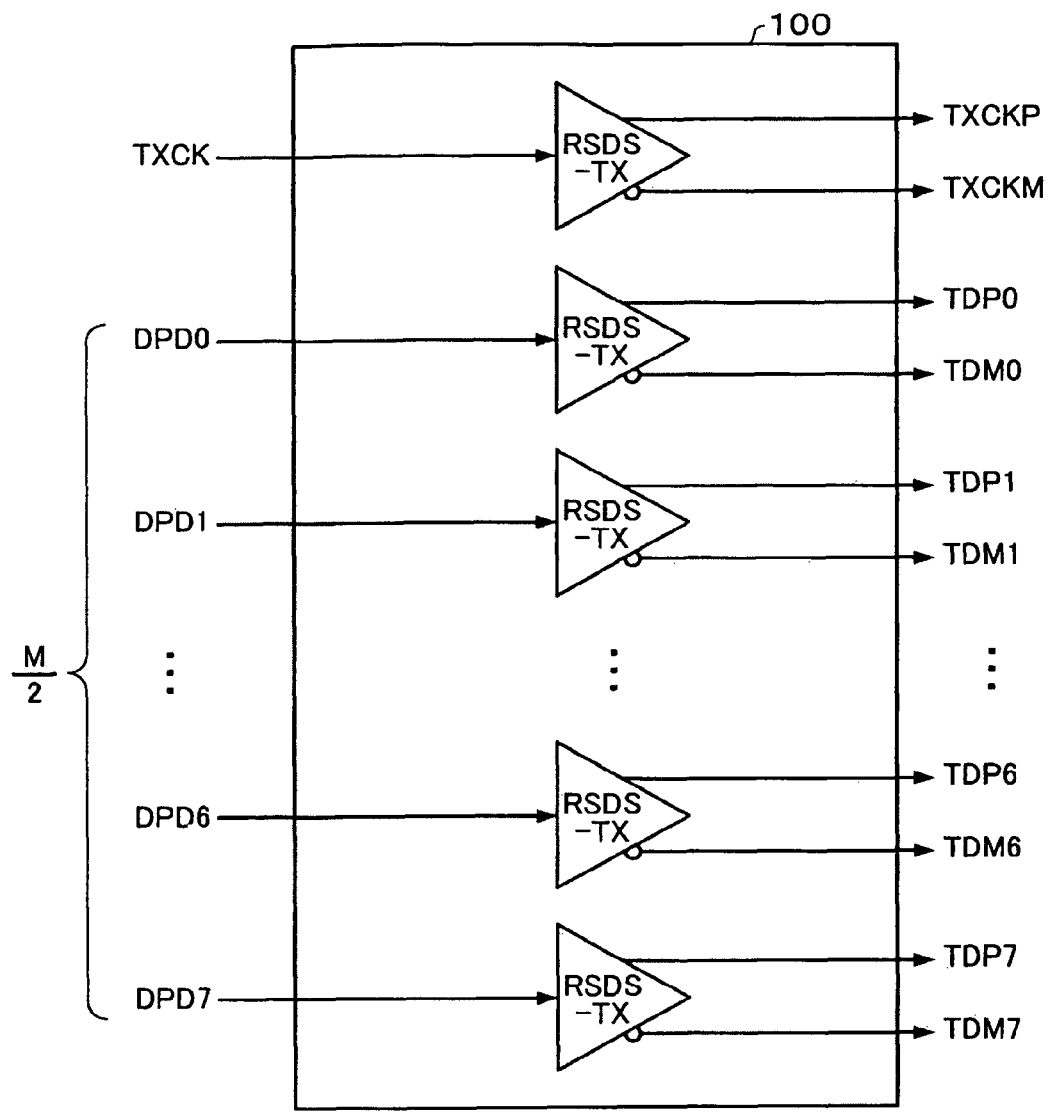
FIG. 4 is a diagram illustrating an exemplary structure of a transmitter circuit according to the embodiment.

FIG. 4 shows an exemplary structure of the transmitter circuit 100 according to the embodiment. The transmitter circuit 100 includes a plurality of differential amplifier circuits RSDS-TX one of which receives the transmission clock TXCK and outputs differential clock signals TXCKP and TXCKM. In the embodiment, for example, if the selector SL shown in FIG. 3 is provided to divide the M bit image data DPD into the M/2 image data and output the divided data by using time division multiplexing, (M/2) pieces of differential amplifier circuit RSDS-TX other than the differential amplifier circuit RSDS-TX that receives the transmission clock TXCK are provided in the transmitter circuit 100, as shown in FIG. 4.

When 16 bit (M bits in a broad sense) image data DPD is inputted to the selector SL, the data is divided into 8 bit data and output to the transmitter circuit 100 by using time division multiplexing. Data of each bit of the 8 bit data DPD0 to DPD7 is inputted to the corresponding differential amplifier circuits RSDS-TX Each differential amplifier circuit RSDS-TX outputs differential signals based on the inputted data; for example, the differential amplifier circuit RSDS-TX to which the data DPD0 is inputted outputs differential signals TDP0 and TDM0. Similarly, the data DPD1 to DPD7 is output as differential signals TDP1 to TDP7 and TDM1 to TDM7 by the corresponding differential amplifier circuits RSDS-TX.

If the selector SL shown in FIG. 3 is not provided, it is sufficient to provide M pieces of differential amplifier circuit RSDS-TX other than the differential amplifier circuit RSDS-TX that receives the transmission clock TXCK Additionally, the analog front-end circuit 24 having such a structure that M equals 16 is described as an example in the embodiment, but this is not restrictive.

In the embodiment, reduce swing differential signaling (RSDS registered trademark)) in which the amplitude of the voltage of a differential signal is smaller than that in low voltage differential signaling (LVDS) is used for the differential amplifier circuits RSDS-TX. Because the voltage amplitude of the differential signal m RSDS is smaller than that in LVDS, unnecessary radiation generated in the transmission path of the differential signal can be more reduced. Since LVDS is effective for EMI, the transmitter circuit 100 may be structured such that LVDS is used for differential amplifier circuits RSDS-TX.

Figure 5:
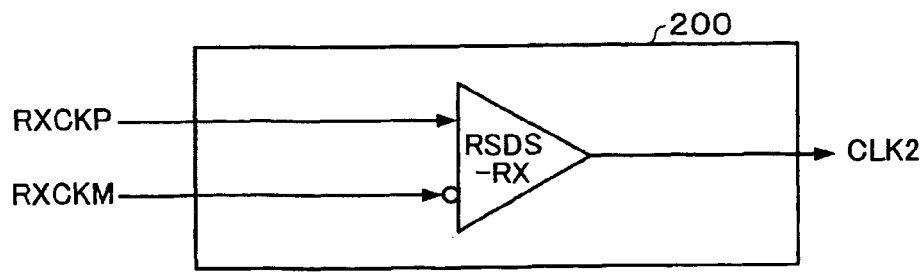
FIG. 5 is a diagram illustrating an exemplary structure of a receiver circuit according to the embodiment.

FIG. 5 shows an exemplary structure of the receiver circuit 200 according to the embodiment. The receiver circuit 200 includes a differential amplifier circuit RSDS-RX. The differential amplifier circuit RSDS-RX generates a reference clock CLK2 (second reference clock in a broad sense) based on the reference clock differential signals RXCKP and RXCKM, and outputs the generated reference clock. The reference clock differential signals RXCKP and RXCKM are supplied, for example, from a main board 50 (refer to FIG. 11) described later.

2.2 Timing Generator

The timing generator 300 shown in FIG. 2 includes a clock pattern set register 310. Information indicating clock patterns for a plurality of clocks generated by the timing generator 300 is stored in the clock pattern set register 310. The timing generator 300 generates the plurality of clocks based on the information indicating the clock patterns. Contents of the clock pattern set register 310 can be programmably altered by using the control signal CS1, for example, and therefore information on clock patterns that user desire can be stored in the clock pattern set register 310.

Figure 7:
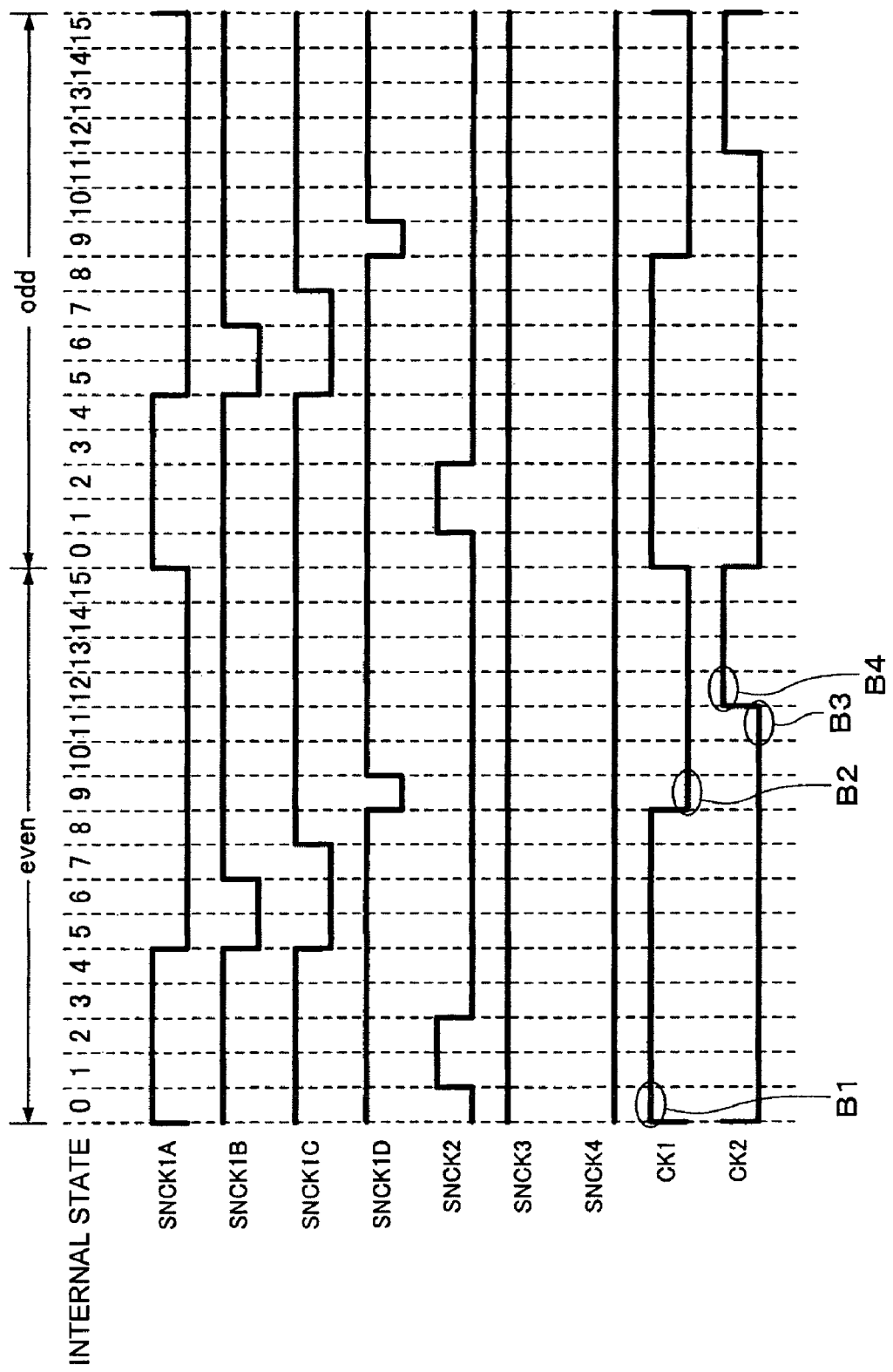
FIG. 7 is a chart illustrating a plurality of waveforms based on the exemplary setting shown in FIG. 6.

To specifically explain the information on clock patterns stored in the clock pattern set register 310, FIG. 6 shows a pattern table of clocks. Numbers 0x00 to 0x0F shown in FIG. 6 indicate addresses of the clock pattern set register 310. FIG. 7 shows waveforms of clocks output from the timing generator 300 when the pattern table is set as shown in FIG. 6.

Reference numbers CK1 and CK2 shown in FIG. 6 indicate clocks, which can be used, for example, as the clocks for driving the analog processing section 400 shown in FIG. 2. Similarly, reference numbers SNCK1A_even to SNCK1D_odd, and SNCK2 to SNCK4 indicate clocks, any one of which can be used, for example, as the driving clock φ1 or φ2 for driving the image sensor 22.

The value of the internal state is incremented, for example, from 0 to 15 during a period of the clock output from the timing generator 300 (e.g. the driving clock φ1 or φ2) or the like. In the next period, the value of the internal state is incremented again from 0 to 15. Thus the internal state circulates, for example, among the values 0 to 15 based on the clock acting as a reference (e.g. the first reference clock CLK1).

The value 0 or 1 is assigned to each clock for every internal state, whereby the clock pattern of each clock is set.

The timing generator 300 sets the output level of each clock based on the value (e.g. 0 or 1) assigned to each clock for every internal state as shown in FIG. 6.

In the case of taking the clock CK1 taken as an example specifically, for example, when the value of the internal state is 0, the value of the clock CK1 in the register is 1, and therefore the output level of the clock CK1 at this time is high as indicated by B1 in FIG. 7. When the value of the internal state is changed to the next value, 1, the value of the clock CK1 in the register is 1 according to FIG. 6, and therefore the output level of the clock CK1 at this time is maintained at a high level. Furthermore, when the value of the internal state is changed to 9, the value of the clock CK1 in the register is 0 set in FIG. 6. Namely, the output level of the clock CK1 is set low as indicated by B2 in FIG. 7.

Similarly, in the case of taking the clock CK2 as an example, for example, when the value of the internal state is 11, the value of the clock CK2 in the register is 0 according to FIG. 6. As indicated by B3 in FIG. 7, the output of the clock CK2 is therefore set at a low level. Furthermore, from FIG. 6, it is shown that when the value of the internal state is changed to 12, the value of the clock CK2 in the register is set to 1. Namely, the output level of the clock CK2 is set high as indicated by B4 in FIG. 7.

Thus, the timing generator 300 can generate clocks based on the values stored in the clock pattern set register 310, using the reference clock CLK1 as reference. The reference clock CLK1 is the clock that is generated on the basis of the reference clock differential signals RXCKP and RXCKM received in the receiver circuit 200 (refer to FIG. 2) as described above. In other words, the clock acting as reference for the clocks (e.g. the driving clock φ1 and φ2) output from the timing generator can be supplied, for example, from the main board 50 (refer to FIG. 11) or the like to the analog front-end circuit 24. This makes it easy, for example, for the main board 50 to process output data QD output from the analog front-end circuit 24 and to supply the control signal CS1 to the analog front-end circuit 24. The design of the main board 50, which is connected to the analog front-end circuit 24, and the like is thereby simplified. Namely, the embodiment allows shortened design period and reduced production cost.

The timing generator 300 also generates the A/D converter clock ADCK based on the reference clock CLK1, and supplies the generated clock to the A/D converter 500. At this time, for example, if the reference clock CLK1 is at 120 MHz, the timing generator 300 can divide the reference clock CLK1, for example, into $1/12$ to output the 10 MHz clock as the A/D converter clock ADCK Additionally, FIG. 6 shows the pattern table in the case where a single color is assigned to the read pixel, but this is not restrictive. For example, if three colors (R. G, and B) are assigned to the read pixel the values of the internal state may be set in 48 stages from 0 to 47.

2.3 Analog Processing Section

Figure 8:
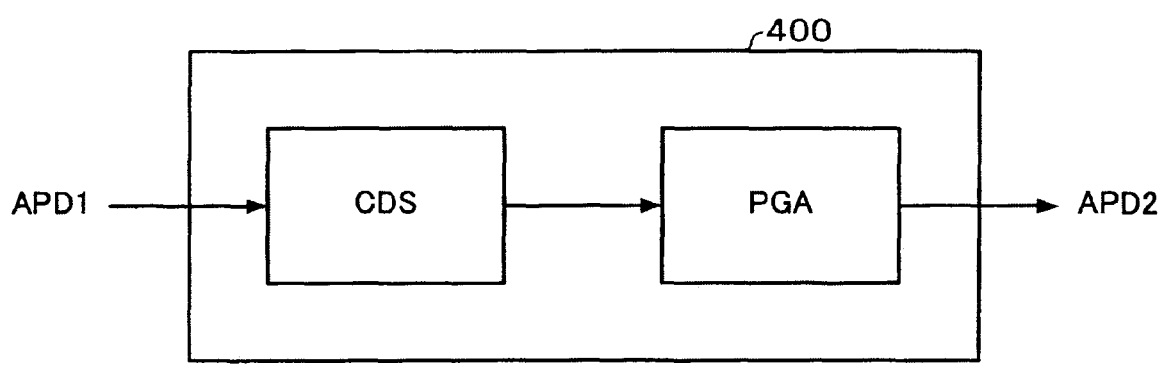
FIG. 8 is a diagram illustrating an exemplary structure of an analog processing section according to the embodiment.

FIG. 8 is a block diagram illustrating the analog processing section 400. The analog processing section 400 includes a correlated double sampling section CDS and an amplifying section PGA.

The correlated double sampling section CDS receives the analog image data APD1 from the image sensor 22, and samples an analog signal of base level (optical black level, reference level) and an analog signal of data level (video level, signal level). The difference value between a sampling value of the analog signal of base level and a sampling value of the analog signal of data level is then output. The sampling of the analog signal is performed on the basis of timing control clock CS2 supplied from the timing generator 300. For example, the timing of sampling and the timing of sampling period and the like associated with the sampling are set on the basis of the timing control clock CS2 supplied from the timing generator 300. The timing generator 300 can generate various clock patterns based on the clock pattern set register 310 as described above. Thus, the clock required for the correlated double sampling section CDS can be adjusted by arbitrary setting of the value of the clock pattern set register 310.

The amplifying section PGA, which can be constituted, for example, of a programmable gain amplifier or the like, adjusts a gain of the output value of the correlated double sampling section CDS, and outputs the analog image data APD2 to the A/D converter 500. Such gain adjustment can ensure an appropriate dynamic range in the A/D converter 500. In the gain adjustment, the level of gain adjustment may be gradually set and assigned to the register so as to become programmable. The arbitrary adjustment of the value of this register can adjust the gain of the output from the correlated double sampling section CDS.

A correction circuit that performs correction for the output of the correlated double sampling section CDS may be provided between the correlated double sampling section CDS and the amplifying section PGA.

3. Modification

Figure 9:
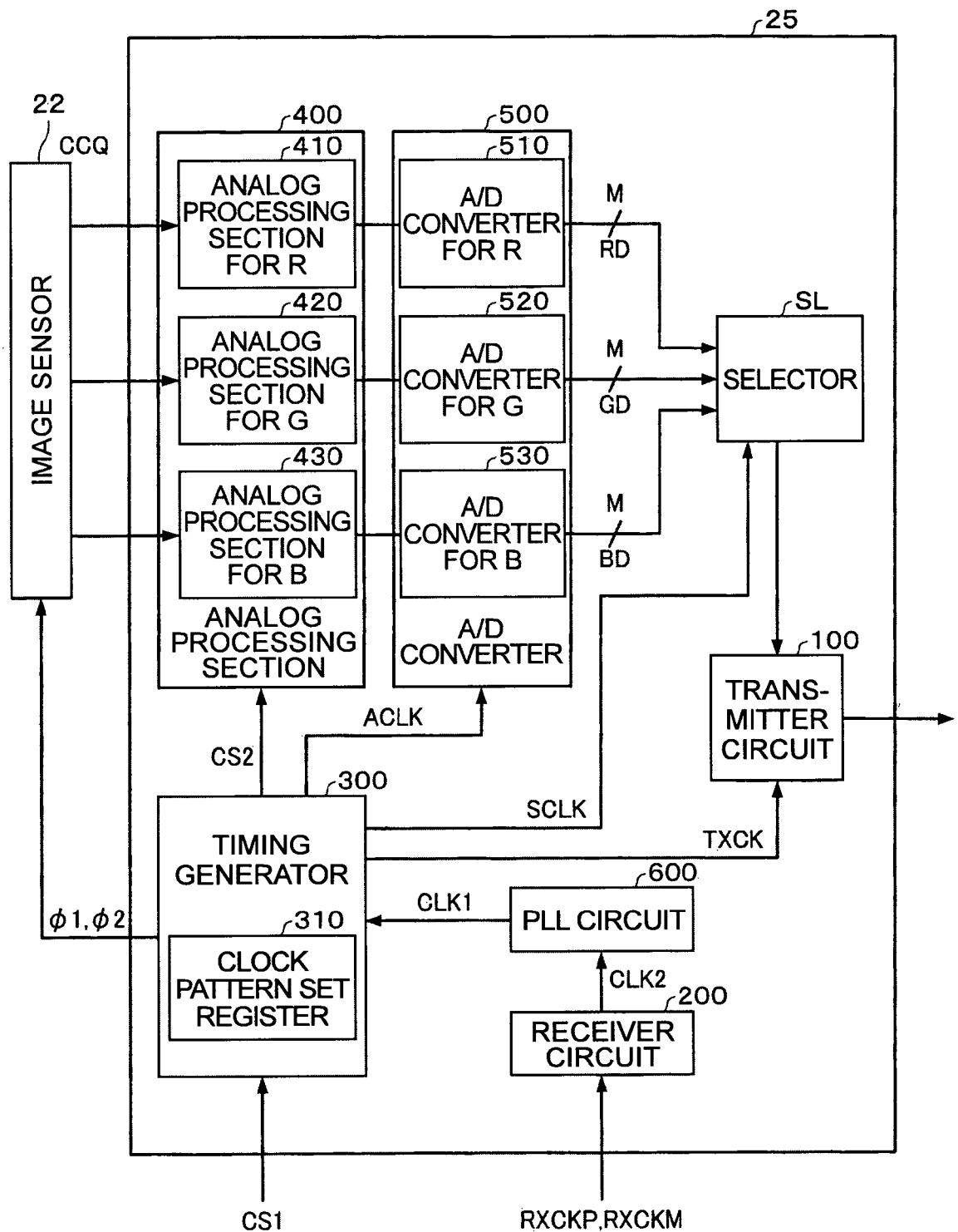
FIG. 9 is a block diagram illustrating an analog front-end circuit of an exemplary modification according to the embodiment.

FIG. 9 is a diagram illustrating an exemplary structure of an analog front-end circuit 25 of a modification according to the embodiment. The selector SL is added to the analog front-end circuit 24 shown in FIG. 2 and the analog processing section 400 and the A/D converter 500 are modified as shown in FIG. 9 in order that three colors (R, G, and B), for example, are assigned to the read pixel. The analog front-end circuit 25 is structured in such a manner. Specifically, the analog processing section 400 of the analog front-end circuit 25 includes an analog processing section for R 410, an analog processing section for G 420, and an analog processing section for B 430. The A/D converter 500 of the analog front-end circuit 25 includes an A/D converter for R 510, an A/D converter for G 520, and an A/D converter for B 530.

The A/D converter for R 510 A/D converts analog image data output from the analog processing section for R 410, and outputs the converted data as image data RD of M bit to the selector SL. The A/D converter for G 520 A/D converts analog image data output from the analog processing section for G 420, and outputs the converted data as image data GD of M bit to the selector SL. The A/D converter for G 520 A/D converts analog image data output from the analog processing section for B 430, and outputs the converted data as image data BD of M bit to the selector SL.

The timing control clock CS2 output from the timing generator 300 includes, but not limited to, a timing signals necessary for each of the analog processing section for R 410, the analog processing section for G 420, and the analog processing section for B 430. For example, the timing control clock may include common timing signals that are supplied to the analog processing sections 410 to 430.

The A/D converter clock ADCK is supplied from the timing generator 300 to the A/D converter 500 in FIG. 9 and the common A/D converter clock ADCK is supplied to A/D converters 510 to 530, but this is not restrictive. For example, timing signals necessary for each of A/D converters 510 to 530 may be generated individually by the timing generator 300, and the clock individually generated may be supplied to the corresponding A/D converter among the A/D converters 510 to 530.

The timing generator 300 supplies a selector clock SCLK to the selector SL but this is not restrictive. For example, a clock generation circuit (e.g. oscillator) may be provided independently in the analog front-end circuit 25 such that a clock generated by the clock generation circuit is supplied to the selector SL as the selector clock SCLK. A clock that the PLL circuit 600 generates may also be supplied to the selector SL as the selector clock SCLK.

The selector SL shown in FIG. 9 divides each supplied image data RD, GD, or BD based on the selector clock SCLK and outputs divided data to the transmitter circuit 100 by using time division multiplexing. For example, the selector SL divides each image data RD, GD, and BD, and outputs the image data by (M/2) bit to the transmitter circuit 100, by using time multiplexing, as shown in FIG. 10.

In the analog front-end circuit 25 of the modification of the embodiment, each image data RD, GD, or BD is supplied to the selector SL in synchronization with a 10 MHz clock. In this case, the selector SL divides a period of the clock of 10 MHz into three parts for three image data RD, GD, and BD, and therefore can output (M×3) bit image data by M bits to the transmitter circuit 100 by using time division multiplexing.

In the analog front-end circuit 25 of the modification according to the embodiment, the selector SL divides into 6 parts a period of the clock (e.g. 10 MHz) used for the supply of the image data RD, GD, and BD. Thus, the selector SL can output (M×3) bit image data by (M/2) bits in synchronization with a 60 MHz clock to the transmitter circuit 100 by using time division multiplexing.

Figure 10:
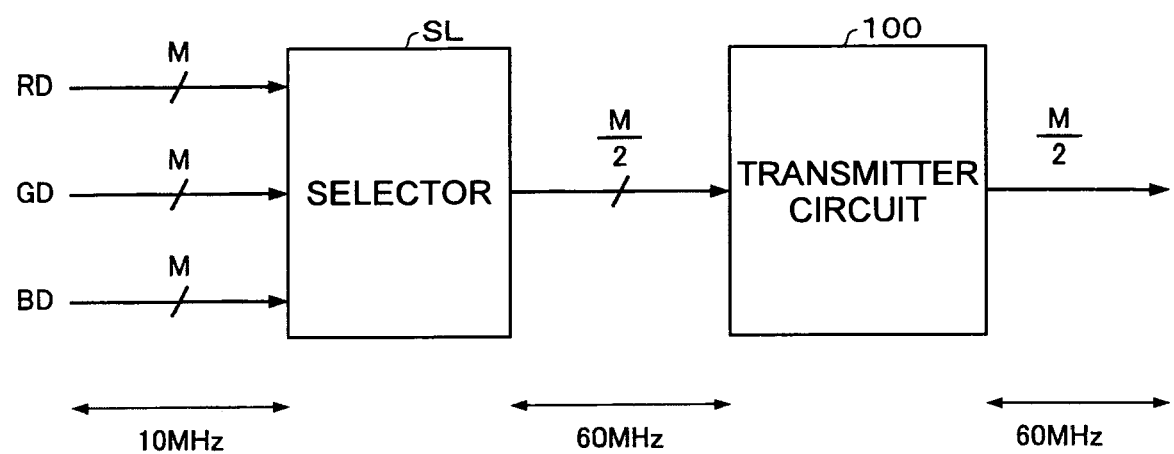
FIG. 10 is another diagram illustrating a selector according to the embodiment.

The data of 10 MHz×M bit×3 is inputted per second into the selector SL shown in FIG. 10. If the number of bits of the image data when output from the transmitter circuit 100 is set to M/2, the selector SL may output (M/2) bit image data in synchronization with 60 MHz clock.

4. Electronic Device

Figure 11:
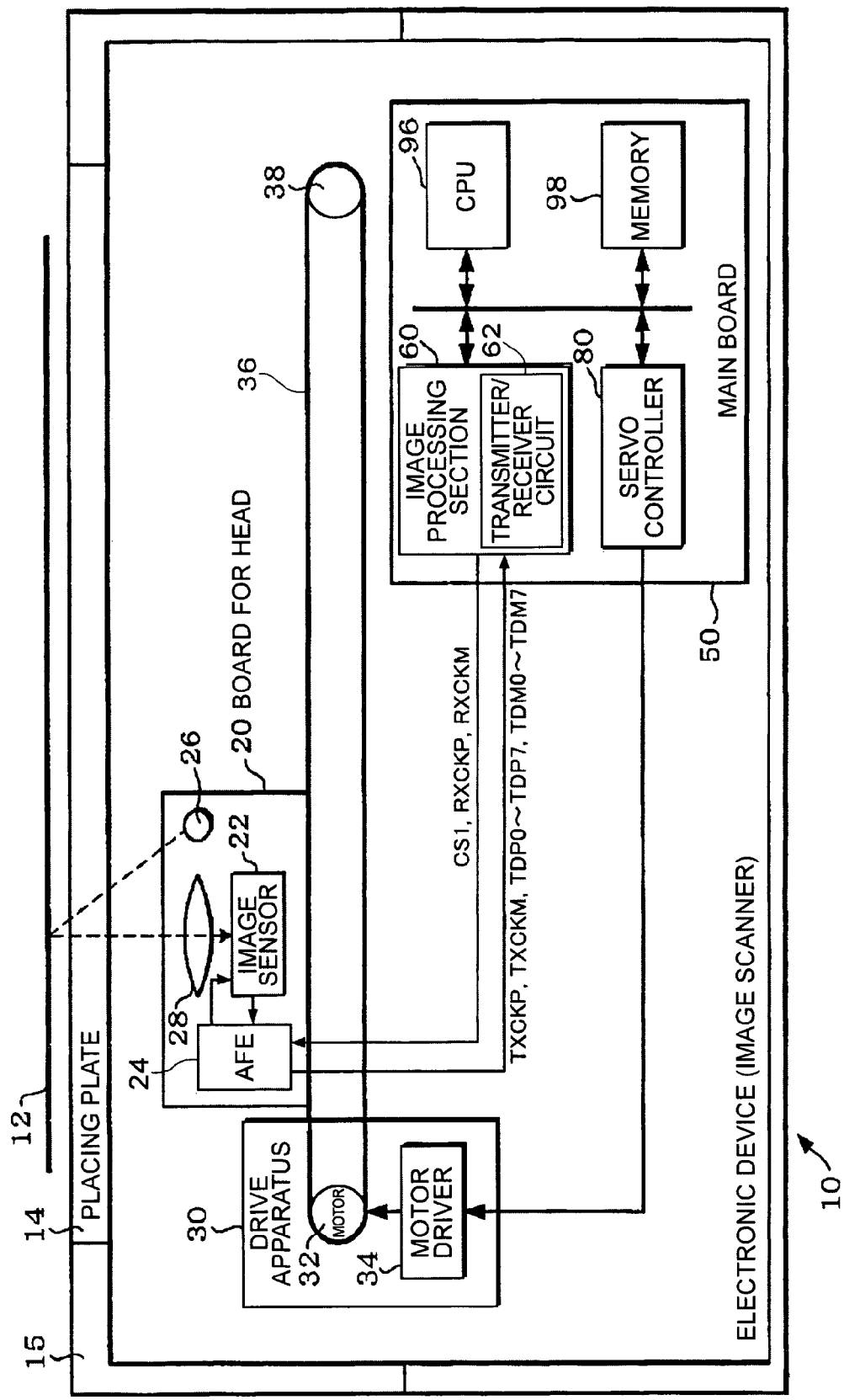
FIG. 11 is a block diagram illustrating an electronic device according to the embodiment.

FIG. 11 is a block diagram that shows an electronic device 10 including the analog front-end circuit (AFE) 24 (or 25) according to the embodiment. The electronic device 10 need not include all the devices shown in FIG. 11, and may be structured such that some of the devices are omitted.

The electronic device 10 (e.g. flat bed type image scanner) includes a placing plate 14 on which a reading object 12 (e.g. original copy) is placed and a frame 15 (e.g. supporting member, housing) that supports the placing plate 14. The placing plate 14 having a rectangular shape is formed of a light transmitting material such as glass. The reading object 12 is placed, for example, on the upper side of this light transmitting placing plate 14.

The electronic device 10 includes a board for head (carriage) 20, on which the image sensor 22 and the analog front-end circuit 24 are mounted. A charge coupled device (CCD), a contact image sensor (CIS) or a bucket brigade device (BBD) can be used as the image sensor 22. A light source 26 for illuminating the reading object 12 (original copy) and an optical system (optical head) such as a lens 28 (focusing unit) that focuses light derived from the light source 26 and reflected by the reading object 12 to the image sensor 22 are also mounted on the board for head 20.

The electronic device 10 includes a drive apparatus 30 (drive mechanism) that drives and moves the board for head 20. The drive apparatus 30 includes a motor 32 (source of power) and a motor driver 34 to drive the motor 32. The image sensor 22 is placed so that its longitudinal direction is the same as the main scanning direction. A drive belt 36 having the opposite side that hangs over a pulley 38 is driven by the motor 32 to move the board for head 20 fixed to the drive belt 36 in the sub scanning direction (in a direction orthogonal to the main scanning direction). Various types of modified practices are allowed as move methods of the board for head 20. For example, the board for head 20 may be moved without using the drive belt 36 or by using a linear motor mechanism.

The electronic device 10 includes the main board 50. The main board 50 controls blocks of the electronic device 10. Specifically, the main board 50 performs the control of image data acquisition, the servo control of the board for head 20, and the control of the analog front-end circuit 24.

The main board 50 includes an image processing section 60. The image processing section 60 includes a transmitter/receiver circuit 62 that transmits and receives a differential signal. The transmitter/receiver circuit 62 includes, but not limited to, a. differential signal receiver circuit and a differential signal transmitter circuit (not shown). The differential signal receiver circuit and the differential signal transmitter circuit may be provided in different blocks, and either of them may be omitted. The transmitter/receiver circuit 62 receives a differential signal from the board for head 20 and acquires image data, and the image processing section 60 performs image processing of the image data acquired. The image processing section 60 can also control for example, the analog front-end circuit 24, but this is not restrictive. A signal to control the analog front-end circuit 24 may be generated in another block placed on the main board 50.

The main board 50 includes a servo controller 80. The servo controller 80 performs the servo control (feedback control) of the drive apparatus 30 (the motor 32), which drives (moves) the board for head 20. The main board 50 includes a CPU 96 (processor) and a memory 98 (ROM, RAM). The CPU 96 performs the overall control of the main board 50 and exchanges information with the outside. The memory 98 stores programs and various types of data, and functions as a work area of the image processing section 60, the servo controller 80, and the CPU 96.

The main board 50 need not include all the devices shown in FIG. 11, and may be structured such that some of the devices are omitted. For example, the CPU 96 and the memory 98 may be omitted. The functions of the main board 50, the image processing section 60, and the servo controller 80 may be implemented by hardware circuits, or may be implemented by both software and hardware circuits. The hardware circuit may be implemented by an application specific integrated circuit (ASIC) containing a gate array, etc., or may be implemented by a general purpose processor.

Figure 12:
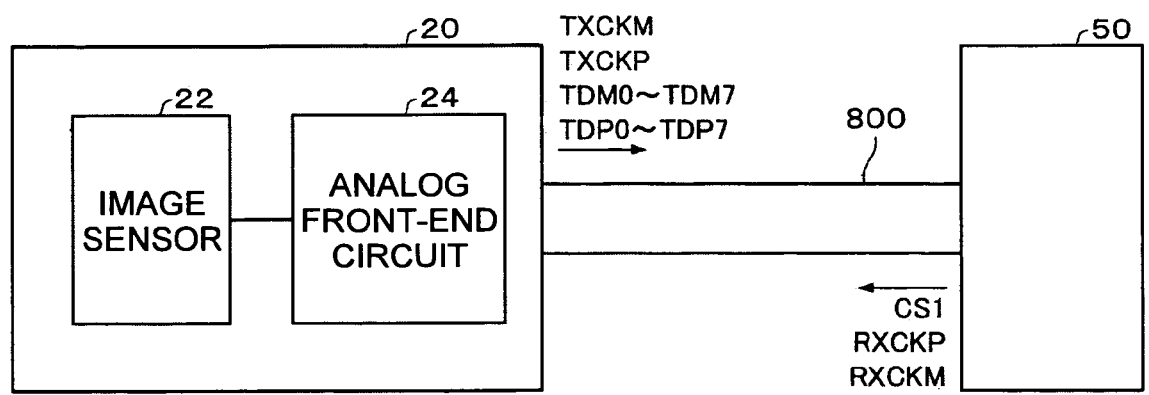
FIG. 12 is a diagram illustrating connection of a board for head and a main board of the electronic device according to the embodiment.

FIG. 12 is a diagram that shows the connection of the board for head 20 and the main board 50. The board for head 20 and the main board 50 are connected with each other with a connection cable 800 including a plurality of pieces of wiring. The differential clock signals TXCKP and TXCKM and the differential signals TDP0 to TDP7 and TDM0 to TDM7 output from the board for head 20 are supplied through the wiring in the connection cable 800 to the main board 50. The reference clock differential signals RXCKP and RXCKM and the control signal CS1 output from the main board 50 are supplied through another piece of wiring in the connection cable 800 to the board for head 20.

In the case of transmitting a signal having a high frequency, the use of a differential signal can suppress unnecessary radiation. In the embodiment, although the frequencies of the differential clock signals TXCKP and TXCKM, the differential signals TDP0 to TDP7 and TDM0 to TDM7, and the reference clock differential signals RXCKP and RXCKM are high to some extent, these signals are differential signals. Hence, the radiation noise and the like generated in the connection cable 800 can be reduced.

The control signal CS1, however, has a far smaller frequency than the differential signals TXCKP and TXCKM and other signals described above, and therefore is transmitted not by using a differential signal but, for example, by using a CMOS level signal. The control signal CS1 is transmitted, for example, by serial communication. Accordingly, for the control signal CS1, a circuit for receiving the differential signal in the analog front-end circuit 24 can be omitted and the circuit for transmitting a differential signal in the main board 50 can be omitted. Furthermore, the use of serial communication can decrease the number of signal lines, allowing the production cost of the connection cable 800 to be reduced. In addition, the control signal CS1 is not restricted to the above structure, and may be a differential signal. In this case, a receiver circuit for the control signal CS1 may be provided in the analog front-end circuit 24, and a transmitter circuit for the control signal CS1 may be provided in the main board 50.

In the embodiment, the reference clock differential signals RXCKP and RXCKM are supplied from the main board 50 to the board for head 20. Namely, the analog front-end circuit 24 provides a prescribed drive based on the reference clock generated on the main board 50. Thus, the differential signals TXCKM and TXCKP and the like output from the analog front-end circuit 24 are generated based on the reference clock generated on the main board 50, so that the main board 50 can control the board for head 20 more easily. This facilitates the timing adjustment of signals transmitted between the main board 50 and the board for head 20, and the like, thereby allowing the design period required for the design of the electronic device 10 to be shortened.

Since the board for head 20 is driven by the drive apparatus 30 to move in a predetermined range as shown in FIG. 11, the connection cable 800 needs to have enough length to cover the movement range. The length of the connection cable 800 is therefore set to some length (e.g. 60 cm) in the embodiment.

In general if a cable is long, the EMI caused by a radiation noise that is generated when a signal is transmitted through the cable becomes a significant problem. As a result, inspections, adjustments, and the like for taking measures against the EMI take much time. This causes a factor to prevent the cost reduction of products. On the other hand, the analog front-end circuit 24 in the embodiment can effectively reduce the radiation noise generated by the connection cable 800 by the use of differential signals in the data transfer between the main board 50 and the board for head 20. Thus, the time period required for the inspections and adjustments for the EMI problem of products, for example, can be shortened significantly, and therefore the cost reduction of products becomes possible.

In addition, because image data among the output data OD output from the analog front-end circuit 24 is (M/2) bits in the embodiment, (M/2) pairs of differential signal lines are provided in the connection cable 800 for the image data transfer. Hence, the number of pieces of wiring provided in the connection cable 800 can be reduced compared to the case where image data output from the analog front-end circuit 24 is M bits. In other words, the reduction of production cost becomes possible.

The smaller the frequency of a clock is, the less the impact of radiation noise generated in the connection cable 800 and the like is. Namely, in order to reduce the radiation noise from the connection cable 800, and the like as much as possible as measures against EMI, the analog front-end circuit 24 may be structured such that the number of pieces of wiring in the differential signal lines for image data transfer are increased and therefore the frequency of the differential signal is decreased. Specifically, the output of the selector SL in the analog front-end circuit 24 is set not to 8 bits but, for example, to 16 bits. As a result, the output clock of the selector SL can be set at a frequency lower than 60 MHz, e.g. 30 MHz. Hence, the frequency of a signal transmitted through the connection cable 800 is lowered, so that the generation of radiation noise can be suppressed.

5. Comparison with Comparative Example and Effect

Figure 13:
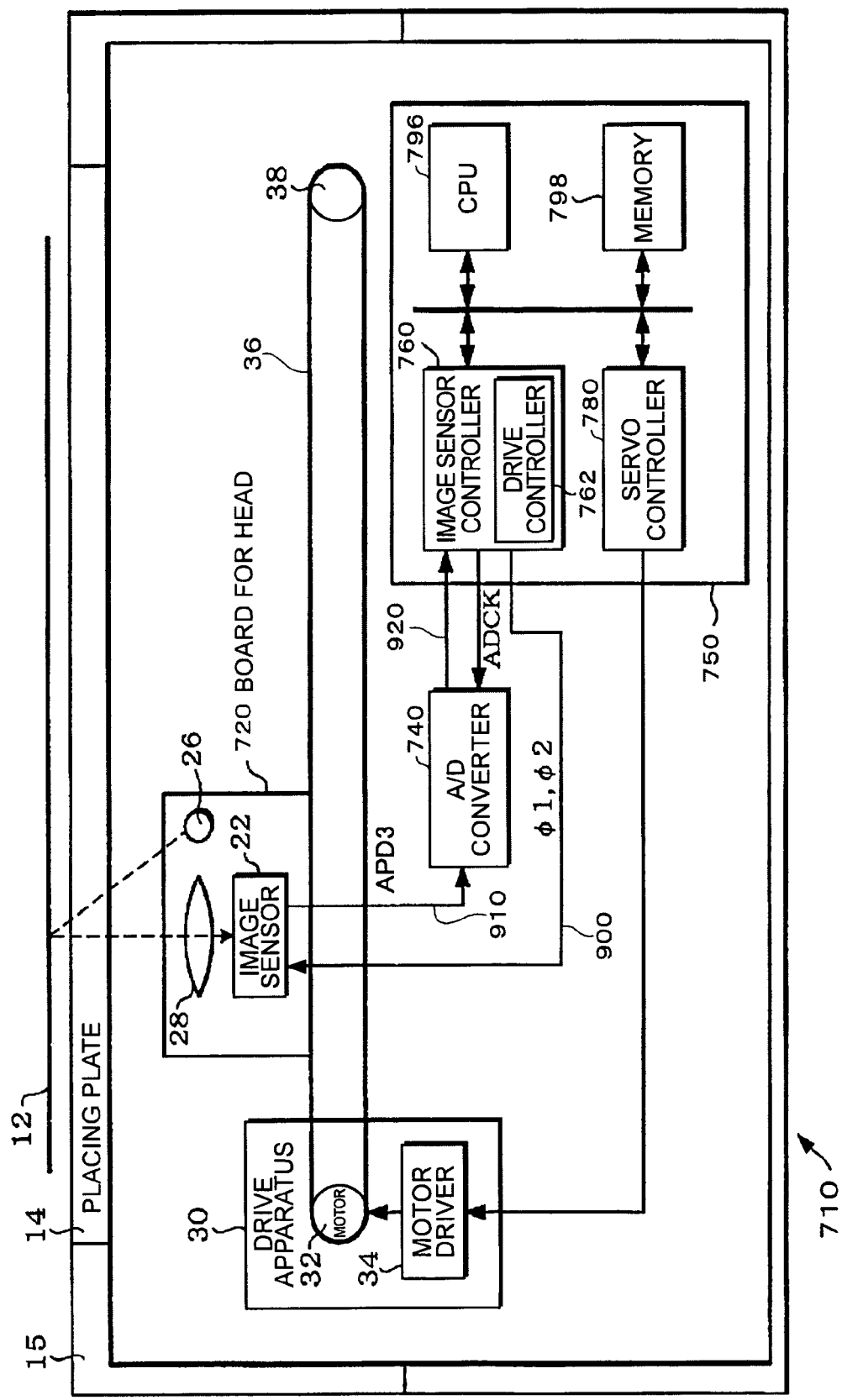
FIG. 13 is a block diagram illustrating a comparative example according to the embodiment.

FIG. 13 is a block diagram illustrating an electronic device 710 of a comparative example according to the embodiment. The electronic device 710 includes a board for head 720. The image sensor 22, the light source 26, and an optical system (optical head) such as and the lens 28 are mounted on the board for head 720. Analog image data APD3 read by the image sensor 22 is inputted to an analog A/D converter 740. The A/D converter 740 converts this to digital image data (image signal) and outputs the digital image data to a main board 750.

The main board 750 includes an image sensor controller 760. The image sensor controller 760 controls the image sensor 22, and generates various types of control signals and drive patterns and outputs them to the image sensor 22. The image sensor controller 760 receives digital image data from the A/D converter 740 and performs various types of image processing (gamma conversion, shading, binarization, and the like). A drive controller 762 that the image sensor controller 760 includes generates the driving clocks φ1 and φ2 of the image sensor 22 and supplies them to the image sensor 22.

In the electronic device 710, radiation noise is generated in a signal path 900, caused by the driving clocks φ1 and φ2. Since the image data APD3 is output as a clock having a high frequency, radiation noise is also generated in signal paths 910 and 920. The length of a cable in which signal path 900, 910, 920, or the like, for example, is provided is set to some value so that the board for head 720 can move within a predetermined range. Therefore, the radiation noise generated in the signal path 900, 910, or 920 further increases its impact.

In order to reduce such radiation noise, it is necessary to take measures against EMI by adding parts that serve as EMI-reduction measures to cables and the like to shield the cables. This increases the number of parts of products and the design period for the products. As a result, reduction of production cost is prevented.

On the other hand, the analog front-end circuit 24 or 25 according to the embodiment can use a differential signal for its output, so that the radiation noise generated when the output from the analog front-end circuit 24 or 25 is transmitted can be reduced. Namely, the analog front-end circuit 24 or 25 can reduce the production cost of products more than the comparative example.

The signal path 900 of the driving clocks φ1 and φ2 in the comparative example may be structured for the use of differential signals. However, the higher resolution the image sensor 22 has, the higher frequency the driving clocks φ1 and φ2 have. For this reason, the signal path 900 including a differential signal line is not sufficient for measures against EMI.

On the other hand, the analog front-end circuit 24 or 25 according to the embodiment includes the timing generator 300 by which the driving clocks φ1 and φ2 are generated, and therefore can supply the driving clocks φ1 and φ2 to the image sensor 22 without the use of the connection cable 800 shown in FIG. 12. In other words, the embodiment can prevent unnecessary radiation caused by the driving clocks φ1 and φ2 in the signal path 900, which is a problem in the comparative example.

In the electronic device 710 of the comparative example, if spread spectrum modulation is applied to the driving clocks φ1 and φ2 output from the image sensor controller 760, the peak value of frequency spectrum of the driving clocks φ1 and φ2 can be spread. However, because the frequencies of the driving clocks φ1 and φ2 are high, this application can be insufficient for measures against EMI. Furthermore, if frequency modulation such as spread spectrum modulation is applied to the driving clocks φ1 and φ2, image data acquired from the image sensor 22 may be degraded.

In order to take sufficient EMI measures in the application of spread spectrum modulation to the driving clocks φ1 and φ2 in the comparative example as described above, an increase in the modulation range is needed for the spread spectrum modulation. If the modulation range is increased, however, the variation in pulse width of the driving clocks φ1 and φ2 is increased. The increase of the variation enhances the possibility that image data output from the image sensor 22 has an unexpected value. This leads to serious degradation of the image quality.

On the other hand, in the embodiment, the driving clocks φ1 and φ2 are supplied to the image sensor 22 without passing through the connection cable 800, for example. This proves that the electronic device 10 of the embodiment is superior to the comparative example in terms of measures against EMI. In the embodiment, because the driving clocks φ1 and φ2 are generated on the board for head 20, the application of spread spectrum modulation to the driving clocks φ1 and φ2 is not needed. Accordingly, the driving clocks φ1 and φ2 having a certain pulse width are supplied to the image sensor 22, and therefore the image data with high accuracy is output from the image sensor 22 compared to the case where spread spectrum modulation is applied to the driving clocks φ1 and φ2. Namely, the electronic device 10 including the analog front-end circuit 24 is excellent for the measures against EMI and allows the high quality image reading.

Figure 14:
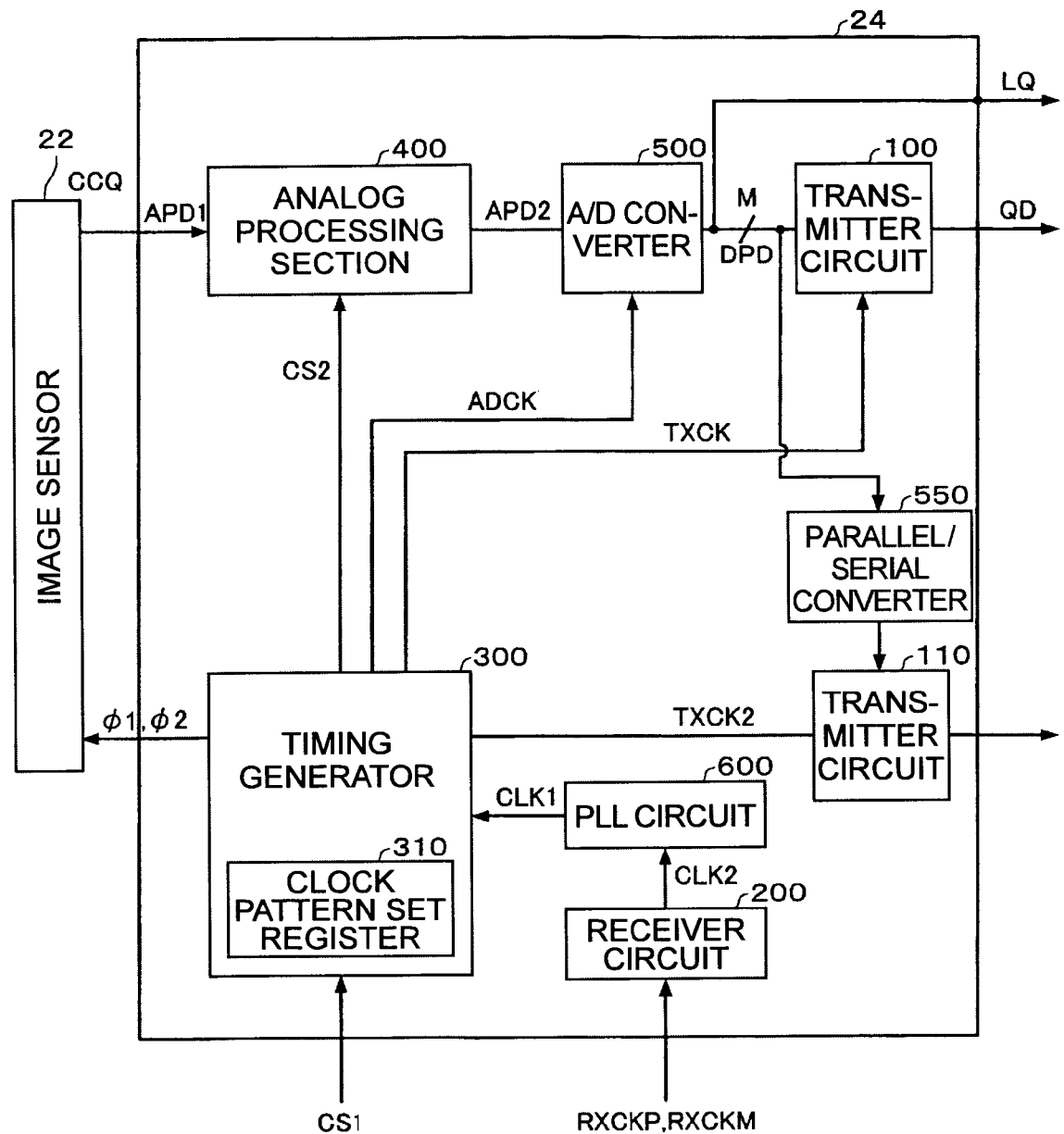
FIG. 14 is a block diagram illustrating an analog front-end circuit of a modification according to the embodiment.

As shown in FIG. 14, the analog front-end circuit 24 may include an output terminal LQ (e.g. at CMOS level) that outputs an M bit output from the A/D converter 500 by means of a system separate from the transmitter circuit 100. In this case, the use of the output terminal LQ allows the test of products to be conducted. The output terminal LQ is connected to the output of the A/D converter 500, but this not restrictive. The output terminal LQ may be structured to connect to the output of the selector SL shown in FIG. 3.

The analog front-end circuit 24 further includes a parallel/serial converter 550 that converts M bit parallel output data output from the A/D converter 500 to the serial data. The transmitter circuit 110 that receives an output from the parallel/serial converter 550 and outputs a differential signal may also be included. Such a structure can reduce signal lines for outputting image data. For example, the width of wiring of the connection cable 800 can be decreased. As a result, production cost of the electronic device 10 can be reduced. In addition, the transmitter circuit 110 receives a reference clock TXCK2 necessary for transmitting supplied from the timing generator 300, but this is not restrictive.

In the structure described above, any one of the plurality of pairs of differential signals QD output from the output terminal LQ and the transmitter circuit 100 and an output from the transmitter circuit 110 may be selected, for example, by utilization of register setting. In this case, an output of the analog front-end circuit 24 can be selected based on information set in the register, and thus the structure can cope with various types of applications.

Detailed description has been given for the embodiment of the invention as described above, but those skilled in the art will readily understand that many modifications may be made without substantially departing from the new matter and effect of the present invention. Therefore, all modifications made in this manner are included in the scope of the invention. For example, any term cited with a different term having broader or the same meaning at least once in this specification and drawings can be replaced with the different term in any place in this specification and drawings.

The entire disclosure of Japanese Patent Application No. 2005-034474, filed Feb. 10, 2005 is expressly incorporated by reference herein.

What is claimed is:

1. An analog front-end circuit that controls an imaging device and processes an analog image signal output from the imaging device, the analog front-end circuit comprising:
    an analog processing section that receives an analog image signal from the imaging device, provides the image signal with predetermined processing, and outputs the image signal;
    an A/D converter that performs A/D conversion with the image signal output from the analog processing section;
    a transmitter circuit that receives digital image data output from the A/D converter, generates a differential signal based on the digital image data, and outputs the differential signal; and
    a timing generator that generates a plurality of clocks including a multiphase driving clock for driving the imaging device based on a first reference clock;
    the transmitter circuit including a differential amplifier circuit that generates a differential signal based on the digital image data output from the A/D converter, and outputting the differential signal generated in the differential amplifier circuit.

2. The analog front-end circuit according to claim 1,
    the timing generator generating a transmission clock as a clock included in the plurality of clocks and outputs the transmission clock to the transmitter circuit; and
    the transmitter circuit generating a differential signal based on the transmission clock, and generating a differential clock signal being a synchronizing clock of the differential signal that the transmitter circuit outputs.

3. The analog front-end circuit according to claim 1, further comprising a PLL circuit that receives a second reference clock, generates a clock by multiplying a frequency of the second reference clock by N, and outputs the clock as the first reference clock.

4. The analog front-end circuit according to claim 3, further comprising a receiver circuit that receives a reference clock differential signal, generates the second reference clock based on the reference clock differential signal received, and supplies the second reference clock to the PLL circuit.

5. The analog front-end circuit according to claim 4, the receiver circuit receiving the reference clock differential signal through a connection cable connecting the transmitter circuit and a main board on which an image processing section processing image data output from the transmitter circuit is mounted from the main board.

6. The analog front-end circuit according to claim 1, the timing generator generating an A/D converter clock that the A/D converter uses for performing A/D conversion, as a clock included in the plurality of clocks, and outputting the A/D converter clock to the A/D converter.

7. The analog front-end circuit according to claim 1, the timing generator generating a timing control clock for the analog processing section, as a clock included in the plurality of clocks, and outputting the timing control clock to the analog processing section.

8. The analog front-end circuit according to claim 1, the analog processing section performing correlated double sampling and amplifying as the certain processing.

9. The analog front-end circuit according to claim 1,
    the timing generator including a clock pattern set register for setting clock patterns of the plurality of clocks; and
    the timing generator generating the plurality of clocks with different clock patterns from the first reference clock based on a set value of the clock pattern set register.

10. The analog front-end circuit according to claim 9,
    setting information of the clock pattern set register of the timing generator being set based on a control signal supplied from a main board on which the image processing section processing image data output from the transmitter circuit is mounted, and
    the control signal being supplied by serial communication.

11. The analog front-end circuit according to claim 1, the analog front-end circuit further including between the A/D converter and the transmitter circuit a selector that outputs the digital image data output from the A/D converter by using time division multiplexing,
    the selector dividing the digital image data into data of a certain bit and sequentially outputting the data divided to the transmitter circuit by using time division multiplexing.

12. An electronic device, comprising:
    a board for head on which the analog front-end circuit according to claim 1 and the imaging device are mounted;
    a main board on which an image processing section processing image data output from the analog front-end circuit is mounted; and a connection cable connecting the board for head and the main board;

the connection cable including a plurality of pairs of differential signal lines; and image data output from the analog front-end circuit being transmitted by a differential signal through the connection cable.

13. The electronic device according to claim 12, the plurality of driving clocks for driving the imaging device being supplied from the analog front-end circuit to the imaging device without passing through the connection cable.

14. The electronic device according to claim 12, the main board including:

a differential signal receiver circuit that receives a differential signal transmitted through the connection cable; and a differential signal transmitter circuit that transmits a reference clock through the connection cable to the board for head by using a differential signal.

* * * * *